(No Model.) 2 Sheets—Sheet 1.
S. D. FIELD.
ELECTRIC RAILWAY.
No. 407,188. Patented July 16, 1889.
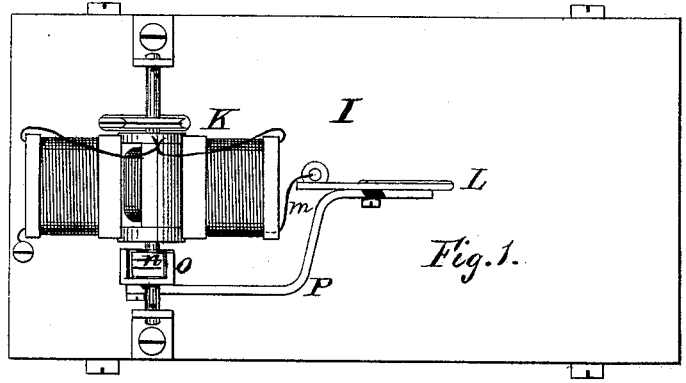
Fig. 1.
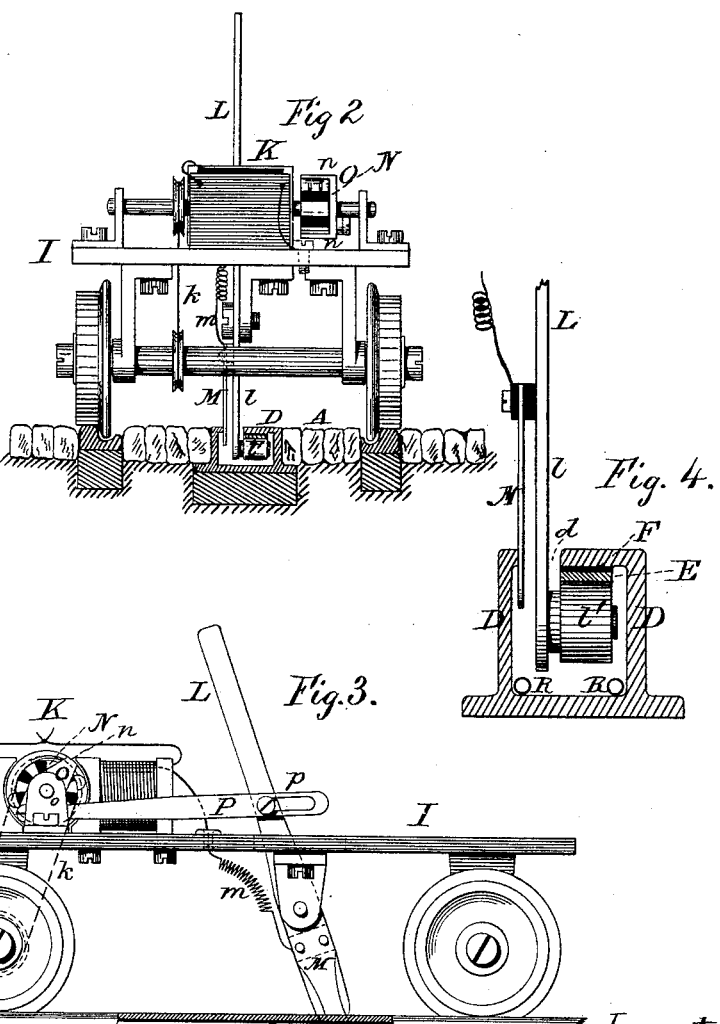
Witnesses:
Miller C. Earl
John C. Sanders
Inventor:
Stephen D. Field,
by his Attorney
Frank L. Pope (No Model.) 2 Sheets—Sheet 2.
S. D. FIELD.
ELECTRIC RAILWAY.
No. 407,188. Patented July 16, 1889.
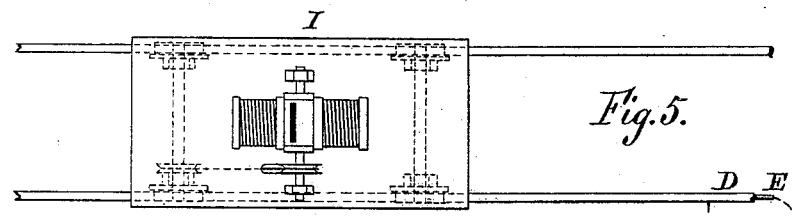
Fig. 5.
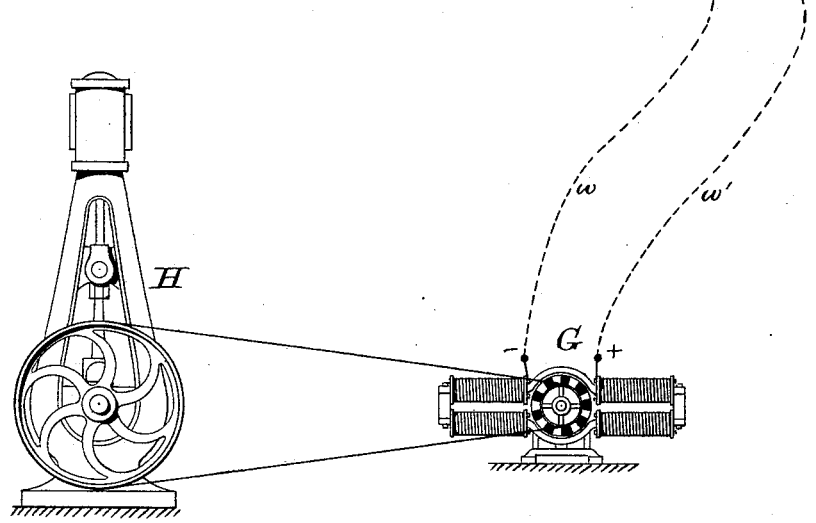
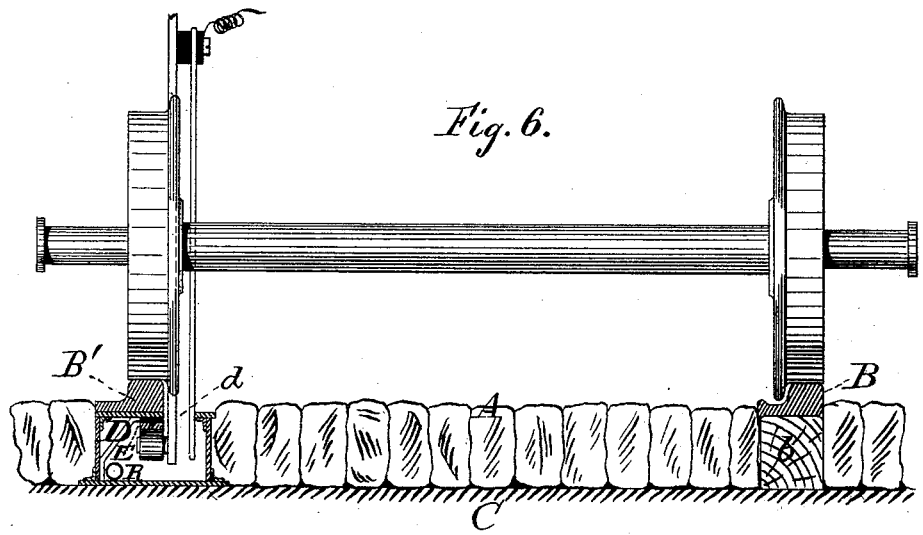
Fig. 6.
Witnesses:— Inventor:
Miller C. Earl. Stephen D. Field.
John C. Sanders. by his Attorney,
Frank L. Pope

UNITED STATES PATENT OFFICE.

STEPHEN D. FIELD, OF NEW YORK, N. Y., ASSIGNOR TO DAVID DUDLEY FIELD, TRUSTEE, AND STEPHEN J. FIELD, CYRUS W. FIELD, HENRY M. FIELD, AND STEPHEN D. FIELD.

ELECTRIC RAILWAY.

SPECIFICATION forming part of Letters Patent No. 407,188, dated July 16, 1889.

Application filed March 10, 1880. Serial No. 4,752. (No model.)

*To all whom it may concern:*

Be it known that I, STEPHEN DUDLEY FIELD, of the city, county, and State of New York, have invented certain new and useful Improvements in Mechanism for Propelling Railway-Cars by Electro-Magnetism, which improvements are fully set forth in the following specification, reference being had to the accompanying drawings.

My invention consists, generally, in mechanism for propelling a railway car or vehicle along a track by means of an electro-magnetic motor mounted thereon, and having its axis mechanically connected with the wheels thereof by means of suitable gearing or belts, and in supplying the necessary electric power to operate said motor by means of one or more stationary electric generators placed at suitable distances apart along and near to the line of the railway, which generators transmit powerful currents of electricity through suitable positive and negative conductors properly insulated from each other and extending along the line of the railway and parallel thereto, which currents act as a medium for the transmission of mechanical power from one or more such stationary motors to the traveling motor, which directly acts to propel the car.

To this end my invention consists, first, in the employment of one or more stationary dynamo-electric generators driven by steam-engines or other suitable motors, in combination with a circuit of conductors composed in part of an insulated or detached section of the line of rails of a railroad-track, a wheeled car, carriage, or vehicle, which is movable upon or along said insulated section of track, an electro-magnetic motor mounted upon said vehicle for propelling the same along the track and included in the said circuit of conductors, together with a device for closing, breaking, or otherwise controlling the said circuit placed upon said vehicle and accessible to the driver or attendant on board the same, whereby the movements of the electro-motor and of the vehicle may be readily controlled by the said driver; second, in the combination of a car, carriage, or vehicle, and an electromotor thus constructed and arranged, with a continuous hollow chamber inclosing an insulated electric conductor and provided with a longitudinal slot to permit the entrance of an arm projecting from said vehicle, so as to protect the conductor from injury, and yet permit a traveling conducting connection to be formed by said arm between the vehicle and the inclosed conductor at any point on the line of the track; third, in the combination of a wheeled carriage or vehicle, an electro-magnetic motor mounted thereon for propelling said vehicle, and a yielding or frictional mechanical connection between the driving-wheels of said vehicle and the electromotor, whereby the rapid movement of the motor in starting is communicated gradually to the vehicle, and any undue strain upon the mechanism is avoided.

In the accompanying drawings, Figure 1 is a plan view of a railway-car and its electromotor. Fig. 2 is a vertical transverse section of the same and of the track upon which it runs. Fig. 3 is a vertical longitudinal section of the same. Fig. 4 is a detached view showing one way of forming a connection between the traveling car and the stationary conductors. Fig. 5 shows the manner of electrically connecting the generating apparatus with the track and insulated conductor extending along the line of the railway; and Fig. 6 shows a modification of my invention, in which the hollow chamber inclosing the insulated conductor is combined with or forms a part of one of the rails of the track.

My invention is designed and adapted more particularly for the propulsion of street-railway cars for the accommodation of the local passenger traffic of cities and towns, although I remark that it may in many instances be employed with advantage under other conditions, some of which will be hereinafter set forth.

In the drawings I have shown my invention as adapted to the conditions of ordinary street traffic upon surface-railways in cities and towns.

In carrying out my invention, it is necessary to provide two electric conductors of sufficient capacity extending the whole length of the railway, or in case the latter is of considerable length it may with advantage be operated in separate sections detached from each other and with their terminal points in close proximity. The conductors must be parallel with the track and must be insulated one from the other, and in addition at least one of them must be insulated from the earth. These conditions may be fulfilled in a practically convenient and economical manner by making use of one or both rails of the track itself as one of the required conductors. In order to do this, it is only necessary to establish a good conducting connection between the ends of the successive abutting rails in line with each other, and this may be effected by riveting or otherwise securing a metallic bar, strap, or rod to the respective rails on each side of every joint, as I have found the ordinary joint fastenings to be in most cases insufficient for this purpose.

The remaining conductor consists of a suitable metallic bar, rod, or strap, extending parallel with the rails throughout the length of the track or section thereof which is to be operated. Under some conditions it would be sufficient to support this conductor upon suitable insulating blocks or pedestals fixed upon the sleepers and projecting above them either between the ordinary rails or outside of them, as might be found most convenient. When, however, the track is required to be laid in the streets or roadways of cities and towns, this arrangement would be objectionable, inasmuch as it would necessarily project above the surface of the roadway and form a serious obstruction to the passage of ordinary vehicles.

One method which I have invented of fulfilling the required conditions and of overcoming the objection stated is shown in Fig. 6 of the drawings, in which—

A represents the pavement of a street or roadway.

B represents one rail of the track, which may be laid upon and secured to a longitudinal sleeper $b$ in the ordinary manner, and the latter may in turn be supported by cross-ties C. The other rail of the track B' is laid upon and secured to a hollow iron girder D, which has a longitudinal slot $d$ through its top, extending its whole length. Parallel with the rail B', and by preference directly beneath it, is a metallic bar, rod, or strap E, which is placed in the chamber within the hollow girder D and secured to its upper side and at the same time insulated therefrom, as best seen in Fig. 4. Such insulation may be conveniently effected by placing a layer F of non-conducting material between the conducting-strap E and the body of the girder. I have found the material known as "vulcanized fiber" to serve the purpose well.

The hollow girder D and rail B' may be rolled in one piece, or they may be composed of separate pieces bolted together. In some cases it may be preferable to separate the rail from the girder, as shown in Fig. 2, an arrangement which, although its first cost is greater, is much more conveniently accessible for making any repairs that may be necessary either of the rails or of the electric conductors. Thus it will be understood that two distinct electrical conductors extend the whole length of the railway, or of such portion thereof as is intended to be operated by a single generator, one of these conductors being the rail B' or the hollow girder D (either or both) and the other the continuous insulated metallic bar or strap E. These two conductors are connected with the terminals of a dynamo-electric or other suitable stationary generator of electricity G (see Fig. 5) by means of suitable wires or conductors $w\ w'$, which generator is driven by a steam-engine or other source of power H.

The car I, Figs. 1, 2, 3, and 5, is mounted upon flanged wheels $i\ i$, and runs upon the rails B B', in the usual manner.

An electro-magnetic motor K of any well-known and suitable construction is mounted upon the said car, and its main shaft or axis is connected with one of the axles of the car by means of a belt $k$. By thus making use of a yielding or frictional connection between the electromotor and the wheels of the vehicle, I avoid any undue strain upon the machinery, such as would otherwise arise from the tendency of the motor to rotate rapidly as soon as its circuit is closed, while the inertia of the vehicle prevents it from getting under way with as much rapidity as the motor. If, therefore, a rigid or unyielding mechanical connection were made use of, the driving machinery would be liable to be injured in consequence of the great power which is exerted by an electromotor at the moment of its starting. In practice I prefer to make use of a system of gear-wheels between the motor and the car-axle, as a smaller and more rapidly-revolving motor can then be made use of, thus economizing space in the car, which is important when the motor is to be placed in a car having passenger accommodations also.

The manner in which I provide for the conveyance of the electric current from the track-conductors to the motor K and of controlling the action of the current upon the motor is as follows: A lever L is secured to the platform or any other convenient portion of the car I. The lower arm of this lever $l$ extends downward below the platform of the car and passes through the slot $d$ into the chamber within the hollow girder D. The end of this lever is armed with a metallic roller $l'$, which presses against the continuous insulated conductor E, as best seen in Figs. 3 and 4. This roller serves to maintain an electric connection between the lever L as it moves with the car along the track and the conductor E. A brush or broom composed of metallic wires may be used in place of the roller $l'$ with good effect.

A blade-spring M is mounted upon the lever L, but is insulated therefrom and presses constantly by virtue of its own resiliency against the edge of the slot $d$. This may also be replaced by a wire, brush, or broom, a device which is especially advantageous on street-railways in consequence of the liability of the conducting-surfaces to be covered with mud and dust, and thus prevent proper electrical connection between the parts. The spring M is connected by a wire $m$ with one terminal of the coil or helix of the electromotor K, the other terminal thereof being connected in the usual manner to the commutator N. This commutator is constructed in the usual and well-known manner, consisting of a ring upon the axis of the motor composed of alternate sections of conducting and insulating material and provided with two metallic springs or brushes $n\ n$, which press against the periphery of the ring as it revolves and alternately break and close the circuit through the motor-magnets as the shaft with its armature revolves. In my apparatus the commutator-springs, although constructed in the ordinary manner, are not fixed to stationary supports, but are mounted upon the opposite ends of a movable rock-shaft which has its center of motion coincident with that of the motor-axis, and the position of this rock-shaft, and therefore of the commutator-springs in reference to the commutator, is controlled through the connecting-bar P by the lever L, to which it is attached by an adjustable screw-and-slot arrangement $p$. By shifting the position of the commutator-springs the direction in which the motor tends to rotate by the action of the current may be reversed without reversing the direction of the current itself, as is well known.

The operation of the apparatus is as follows: Premising by stating that the line of the railway is to be divided into sections, preferably of a length equal to the distance which it is desired to preserve between successive cars or trains of cars moving upon the same track, (one such section being shown in Fig. 5,) the conductors D and E are charged with electricity of opposite polarity from the terminals or poles of the generator G, being connected therewith by the wires $w\ w'$. If now the car I be supposed to be standing at any point on the section of railway with its lever L in a perpendicular position, the roller $l'$ will not then be in contact with the conductor E and no electric connection will be formed between the conductors E and D; but if the lever L be moved into the position shown in Fig. 3 the roller $l'$ will be brought in contact with the conductor E and a powerful current of electricity will pass from one conductor to the other through roller $l'$, lever L, and connecting-bar P to the commutator-springs $n\ n$, thence through the commutator N and the coils of the motor K, and thence through wire $m$ and blade-spring M to the other conductor D, which will cause the motor to revolve rapidly and powerfully and to propel the car I along the track. By throwing the lever L into a reverse position the action of the motor is also reversed and the car will be propelled in the opposite direction. Thus by means of the lever L the car may be started, stopped, or reversed at any moment with the utmost convenience and facility.

The arrangement of the circuits may be in many cases altered with advantage by connecting the wire $m$ to the wheels and axles of the car and dispensing with the spring, in which case the rail B of the track may be utilized as one conductor, as hereinbefore set forth. A still better arrangement is that of connecting the wire $m$ both with the spring M and the axles and wheels of the car, and the corresponding conductor leading from the generator with both the rail B' and the girder D. This is especially applicable when the latter are combined together in the manner shown in Fig. 6, and is in most cases to be preferred to the one previously described.

It will be observed that this method of operating a railway may be made to furnish absolute security against collisions. In case one car is following another upon the same line of track, and by failing to observe signals or by the accidental stoppage of the forward car the hindmost one should attempt to enter upon the same section, the current from the generator will be divided between the two cars, and the speed of each will be greatly reduced thereby, but by stopping the hindmost car by putting its lever in mid-gear the full power of the generator will act upon the forward car and propel it rapidly on to the next section.

I do not claim herein the combination which I have described of an electromotor and its commutator with a circuit-controlling lever capable of three positions, the first closing the circuit on the commutator when in position to produce a forward motion of the motor, the second closing the circuit on the commutator when in a position to produce a backward motion of the motor, and the third interrupting or cutting off the circuit from the motor, as this combination has been claimed in Letters Patent granted to me July 13, 1880, No. 229,991, application filed June 9, 1880.

I claim as my invention—

1. The combination, substantially as hereinbefore set forth, of a stationary dynamo-electric generator driven by a suitable motor, a circuit of conductors composed in part of an insulated or detached section of the line of rails of a railroad-track, a wheeled vehicle movable upon or along said insulated section of track, an electro-magnetic motor mounted upon said vehicle for propelling the same and included in said circuit of conductors, and a circuit-controlling device placed upon said vehicle.

2. The combination, substantially as hereinbefore set forth, of a railway carriage or vehicle propelled by an electro-magnetic motor mounted thereon, with a continuous hollow chamber inclosing an insulated electric conductor and provided with a longitudinal slot to permit the entrance of an arm projecting from said carriage, so as to form a traveling electric connection with said insulated conductor.

3. The combination, substantially as hereinbefore set forth, of a wheeled carriage or vehicle, an electro-magnetic motor mounted thereon, and a yielding or frictional mechanical connection between the driving-wheels of said vehicle and the electromotor.

In witness whereof I have hereunto set my hand this 8th day of March, A. D. 1880.

STEPHEN D. FIELD.

Witnesses:
FRANK L. POPE,
MILLER C. EARL.